United States Patent
Jang

(10) Patent No.: US 11,040,264 B2
(45) Date of Patent: Jun. 22, 2021

(54) PLAYER MATCHING DEVICE AND PLAYER MATCHING METHOD

(71) Applicant: GOLFZON CO., LTD., Daejeon (KR)

(72) Inventor: Sung Won Jang, Seoul (KR)

(73) Assignee: GOLFZON CO., LTD., Daejeon (KR)

( * ) Notice: Subject to any disclaimer, the term of this patent is extended or adjusted under 35 U.S.C. 154(b) by 181 days.

(21) Appl. No.: 16/048,496

(22) Filed: Jul. 30, 2018

(65) Prior Publication Data

US 2018/0333630 A1 Nov. 22, 2018

Related U.S. Application Data

(63) Continuation of application No. PCT/KR2017/000878, filed on Jan. 25, 2017.

(30) Foreign Application Priority Data

Feb. 2, 2016 (KR) .................. 10-2016-0012615

(51) Int. Cl.
*A63B 69/36* (2006.01)
*A63F 13/795* (2014.01)
(Continued)

(52) U.S. Cl.
CPC ...... *A63B 69/3691* (2013.01); *A63B 71/0616* (2013.01); *A63F 13/795* (2014.09);
(Continued)

(58) Field of Classification Search
CPC ............ A63B 69/3691; A63B 71/0616; A63B 2102/32; A63F 13/795; G06F 3/011; H04L 67/38
(Continued)

(56) References Cited

U.S. PATENT DOCUMENTS 6,321,128 B1* 11/2001 Costin, IV ............. A63B 69/36
473/131
6,461,245 B1* 10/2002 Morgan ............. A63B 24/0021
473/131
(Continued)

FOREIGN PATENT DOCUMENTS

CN 101770543 A 7/2010
CN 102114329 A 7/2011
(Continued)

OTHER PUBLICATIONS

Japan Golf Association, What is a handicap, URL: https://web.archive.org/web/20150807063936/http://www.jga.or.jp/jga/html/handicap/image/hp_handicap.pdf, Aug. 7, 2015, JGA homepage.

*Primary Examiner* — Eugene L Kim
*Assistant Examiner* — Rayshun K Peng
(74) *Attorney, Agent, or Firm* — Korus Patent, LLC; Seong Il Jeong

(57) ABSTRACT

The present invention relates to a player matching device and a player matching method. According to a first aspect of the present invention, there may be provided a player matching device for matching a virtual user capable of playing a virtual golf game with a player on a virtual golf course with the player, the player matching device including: a level determination unit configured to determine at least one of the skill level of the player and the skill level of a virtual user; and an opponent determination unit configured to determine an opponent capable of playing a virtual golf game with the player, wherein the opponent determination unit extracts one or more virtual users having a skill level within a predetermined range based on the skill level of the player, and determines the opponent to be a virtual user including at least part of the extracted virtual users.

14 Claims, 4 Drawing Sheets

(51) Int. Cl.
*H04L 29/06* (2006.01)
*G06F 3/01* (2006.01)
*A63B 71/06* (2006.01)
*A63B 102/32* (2015.01)

(52) U.S. Cl.
CPC .............. *G06F 3/011* (2013.01); *H04L 67/38* (2013.01); *A63B 2102/32* (2015.10); *A63B 2220/30* (2013.01); *A63B 2220/76* (2013.01); *A63B 2225/20* (2013.01)

(58) Field of Classification Search
USPC ........................................................ 473/131
See application file for complete search history.

(56) References Cited

U.S. PATENT DOCUMENTS

| | | | | | |
|---|---|---|---|---|---|
| 7,806,777 | B2* | 10/2010 | Cheng | ................... | A63F 7/0628 |
| | | | | | 473/131 |
| 2003/0045359 | A1* | 3/2003 | Leen | ................... | G07F 17/3244 |
| | | | | | 463/42 |
| 2011/0230985 | A1* | 9/2011 | Niegowski | ............. | A63B 24/00 |
| | | | | | 700/91 |
| 2011/0250939 | A1* | 10/2011 | Hobler | ............... | A63B 69/3623 |
| | | | | | 463/7 |
| 2012/0021823 | A1* | 1/2012 | Youm | ................... | A63F 13/497 |
| | | | | | 463/29 |
| 2012/0231888 | A1* | 9/2012 | Abe | ........................ | H04L 67/38 |
| | | | | | 463/42 |
| 2013/0260914 | A1 | 10/2013 | Ishii et al. | | |
| 2013/0331177 | A1* | 12/2013 | Arnone | ............... | G07F 17/3211 |
| | | | | | 463/25 |

FOREIGN PATENT DOCUMENTS

| | | |
|---|---|---|
| CN | 104321113 A | 1/2015 |
| JP | 2008-018152 A | 1/2008 |
| JP | 2008-021104 A | 1/2008 |
| JP | 2009-247548 A | 10/2009 |
| JP | 2013-516212 A | 5/2013 |
| JP | 2014-146188 A | 8/2014 |
| KR | 10-0970678 B1 | 7/2010 |
| KR | 10-2011-0026061 A | 3/2011 |
| KR | 10-2014-0020591 A | 2/2014 |
| KR | 10-1682655 B1 | 12/2016 |
| TW | 201108023 A | 3/2011 |
| TW | 201538216 A | 10/2015 |

* cited by examiner

PLAYER MATCHING DEVICE AND PLAYER MATCHING METHOD

TECHNICAL FIELD

The present invention relates to a player matching device and a player matching method, and more specifically to a device and method for matching a virtual user capable of playing a virtual golf game with a player on a virtual golf course with the player.

BACKGROUND ART

As interest in golf has increased, screen golf which enables a user to play golf without going to a golf field has been popularized.

Screen golf is configured to, by means of a virtual golf simulation device, provide an image of a virtual golf course to a player, detect the moving speed, direction, etc. of a golf ball or golf club when a user hits the golf ball by swinging the golf club in the same manner as he or she plays golf on an actual golf course, and output an image of the movement of the golf ball onto the virtual golf course. Such screen golf provides a player with a realistic feeling of playing a golf game on an actual golf field.

The enjoyment of golf is increased only when it is played with another player while comparing score records. However, if a sufficient number of other players are not playing screen golf when a player plays golf, or if another player having a level identical to that of a player is not playing screen golf, the player can play a golf game with another player. Furthermore, if another player with whom a player desires to play screen golf does not play the screen golf when the player intends to play a golf game, the player cannot play a golf game with the other player.

In connection with this, the prior art document Korean Patent Application Publication No. 10-2014-0020591 discloses an online golf tournament service apparatus and method which induce interest in screen golf apparatuses and encourage the use of screen golf apparatuses. However, the prior art proposes only a method of holding a golf tournament among actual players, but does not overcome the above-mentioned problems.

Therefore, there is a need for technology capable of overcoming the above-described problems.

Meanwhile, the above-described background technology corresponds to technical information which has been possessed by the present inventor in order to contrive the present invention or which has been acquired in the process of contriving the present invention, and can not necessarily be regarded as a well-known technology which had been known to the public prior to the filing of the present invention.

DISCLOSURE

Technical Problem

An object of an embodiment of the present invention is to propose a player matching device and a player matching method.

Furthermore, an object of an embodiment of the present invention is to match a player and a virtual user with each other, thereby enabling the player to enjoy a virtual golf game anytime and anywhere.

Moreover, an object of an embodiment of the present invention is to match a virtual user having a level identical or similar to that of a player with the player, thereby maximizing the enjoyment of the player in a virtual golf game.

Technical Solution

As a technical solution for accomplishing the above objects, according to a first aspect of the present invention, there may be provided a player matching device for matching a virtual user capable of playing a virtual golf game with a player on a virtual golf course with the player, the player matching device including: a level determination unit configured to determine at least one of the skill level of the player and the skill level of a virtual user; and an opponent determination unit configured to determine an opponent capable of playing a virtual golf game with the player, wherein the opponent determination unit extracts one or more virtual users having a skill level within a predetermined range based on the skill level of the player, and determines the opponent to be a virtual user including at least part of the extracted virtual users.

According to a second aspect of the present invention, there may be provided a player matching method by which a player matching device matches a virtual user capable of playing a virtual golf game with a player on a virtual golf course with the player, the player matching method including: determining at least one of the skill level of the player and the skill level of a virtual user; and determining an opponent capable of playing a virtual golf game with the player, wherein determining the opponent includes extracting one or more virtual users having a skill level within a predetermined range based on the skill level of the player, and determining the opponent to be a virtual user including at least part of the extracted virtual users.

According to a third aspect of the present invention, there may be provided a computer-readable storage medium having stored thereon a program which performs a player matching method, wherein the player matching method includes: determining at least one of the skill level of the player and the skill level of a virtual user; and determining an opponent capable of playing a virtual golf game with the player, wherein determining the opponent includes extracting one or more virtual users having a skill level within a predetermined range based on the skill level of the player, and determining the opponent to be a virtual user including at least part of the extracted virtual users.

According to a fourth aspect of the present invention, there may be provided a computer program stored in a storage medium such that a player matching device performs a player matching method, wherein the player matching method includes: determining at least one of the skill level of the player and the skill level of a virtual user; and determining an opponent capable of playing a virtual golf game with the player, wherein determining the opponent includes extracting one or more virtual users having a skill level within a predetermined range based on the skill level of the player, and determining the opponent to be a virtual user including at least part of the extracted virtual users.

Advantageous Effects

According to any one of the above-described technical solutions of the present invention, an embodiment of the present invention is configured to propose a player matching device and a player matching method.

Furthermore, according to any one of the above-described technical solutions of the present invention, an embodiment of the present invention is configured to match a player and a virtual user with each other, thereby enabling the player to enjoy a virtual golf game anytime and anywhere.

Furthermore, according to any one of the above-described technical solutions of the present invention, an embodiment of the present invention is configured to perform matching based on the skill levels of a player and a virtual user determined according to various methods, thereby determining a virtual user more appropriate for the player and then enabling the virtual user to play a golf game with the player.

Furthermore, according to any one of the above-described technical solutions of the present invention, an embodiment of the present invention is configured to match a virtual user having a level identical or similar to that of a player with the player, thereby maximizing the enjoyment of the player in a virtual golf game.

Moreover, according to any one of the above-described technical solutions of the present invention, an embodiment of the present invention is configured to match virtual users against a player sequentially from a virtual user having the earliest play data, thereby sufficiently utilizing play data registered as the play data of the virtual users.

The effects which can be acquired by the present invention are not limited to the above-described effects, and other effects which have not been described will be clearly understood by those having ordinary knowledge in the art, to which the present invention pertains, from the following description.

MODE FOR INVENTION

Figure 1:
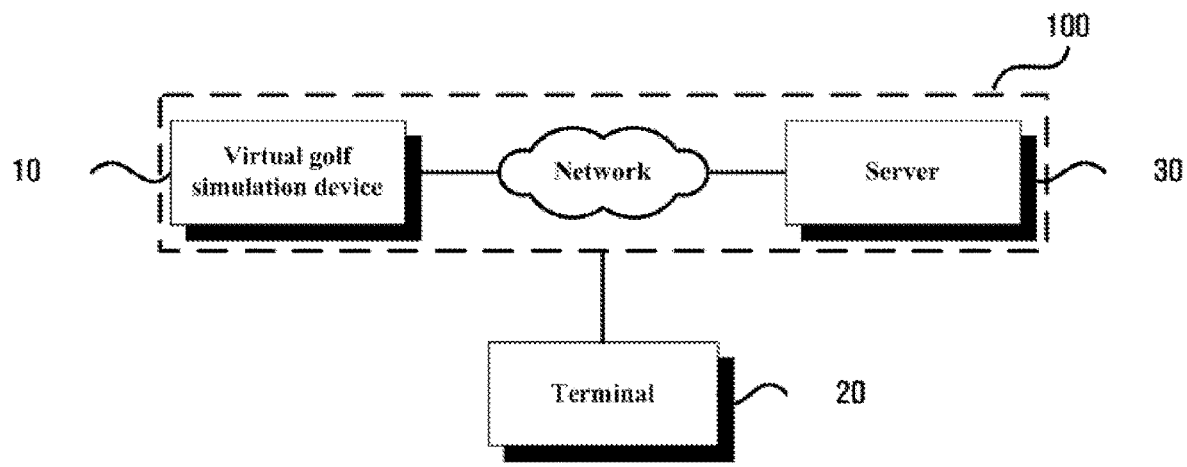
FIG. 1 shows a schematic block diagram of a matching system according to an embodiment of the present invention.

Embodiments of the present invention will be described in detail below with reference to the accompanying drawings so that those having ordinary knowledge in the art to which the present invention pertains can easily practice the present invention. However, the present invention may be implemented in various different forms, and are not limited to the embodiments described herein. Furthermore, in the drawings, portions unrelated to the following description will be omitted in order to clearly describe the present invention. Throughout the overall specification, like reference symbols will be assigned to like portions.

Throughout the overall specification, when a portion is described as being "connected" to another portion, this includes not only a case where they are "directly connected" to each other but also a case where they are "electrically connected" to each other with another component interposed therebetween. Furthermore, when a portion is described as "including" a component, this means that another component is not be excluded from the portion but may be included in the portion, unless particularly described to the contrary.

The present invention will be described in detail with reference to the accompanying drawings.

Prior to the detailed description, the meanings of terms which will be used below are defined first.

The term 'player' refers to a user who desires to play a golf game via a virtual golf simulation device, whereas the term 'virtual user' refers to a user which can play a golf game with a player and does not play a golf game via the virtual golf simulation device during the play of the golf game with the player. In other words, a virtual user refers to a virtual player, not an actual player.

The term 'virtual user' may include a 'recording player' and a 'ghost player.'

The term 'recording player' refers to a player who operates based on the play data of any player who played a golf game before a request for the play of a golf game from a player.

In connection with this, the term 'play data' refers to information which was generated when a corresponding player played a golf game. For example, the term 'play data' may include information concerning identification information adapted to identify the play data (e.g., the identification information of the corresponding player, or the like), the date on which play data was generated (time, or the like), information about the path of a golf ball attributable to a golf shot at each hole when a golf game is played, an image matching a player (or a moving image; e.g., a moving image of a golf shot of the player, or the like), etc.

In contrast, the term 'ghost player' refers to a player who operates according to play data generated based on the play data of one or more recording players. A 'ghost player' may be selected as an opponent of a player when a 'recording player' cannot be matched with the player for the purpose of the play of a golf game, and may have play data composed of the combination of the play data of one or more recording players.

Terms requiring descriptions, other than the terms defined above, will be separately described below.

FIG. 1 shows a schematic block diagram of a matching system according to an embodiment of the present invention.

The matching system 100 includes at least one virtual golf simulation device 10 and a server 30, which are connected over a wired and/or wireless network and may communicate with each other. Furthermore, the matching system 100 is also connected to a terminal 20, and may also communicate with the terminal 20.

The terminal 20 includes all types of devices used by a player to access the matching system 100, and may be generally an electronic terminal. For example, the terminal 20 may be any one of a console, a cellular phone, a personal computer (PC), a tablet computer, a mobile communication terminal, a notebook, a personal digital assistant (PDA), etc. Accordingly, a player may access the matching system 100 via the terminal 20. Furthermore, when a player has provided play data as a virtual user, he or she may view whether or not a game has started, the progress of a game, a game result, or the like in connection with an opponent player matched with him or her via the terminal 20.

Meanwhile, the virtual golf simulation device 10 according to an embodiment of the present invention detects a golf shot of the player, simulates a detection result, and outputs a simulation result onto a screen. Accordingly, the player may play virtual golf on a virtual golf course via the virtual golf simulation device 10. Furthermore, the player who is playing the virtual golf via the one virtual golf simulation device 10 may play the virtual golf game with another player via another virtual golf simulation device. Moreover, the player may play a virtual golf game with a virtual user.

Figure 2:
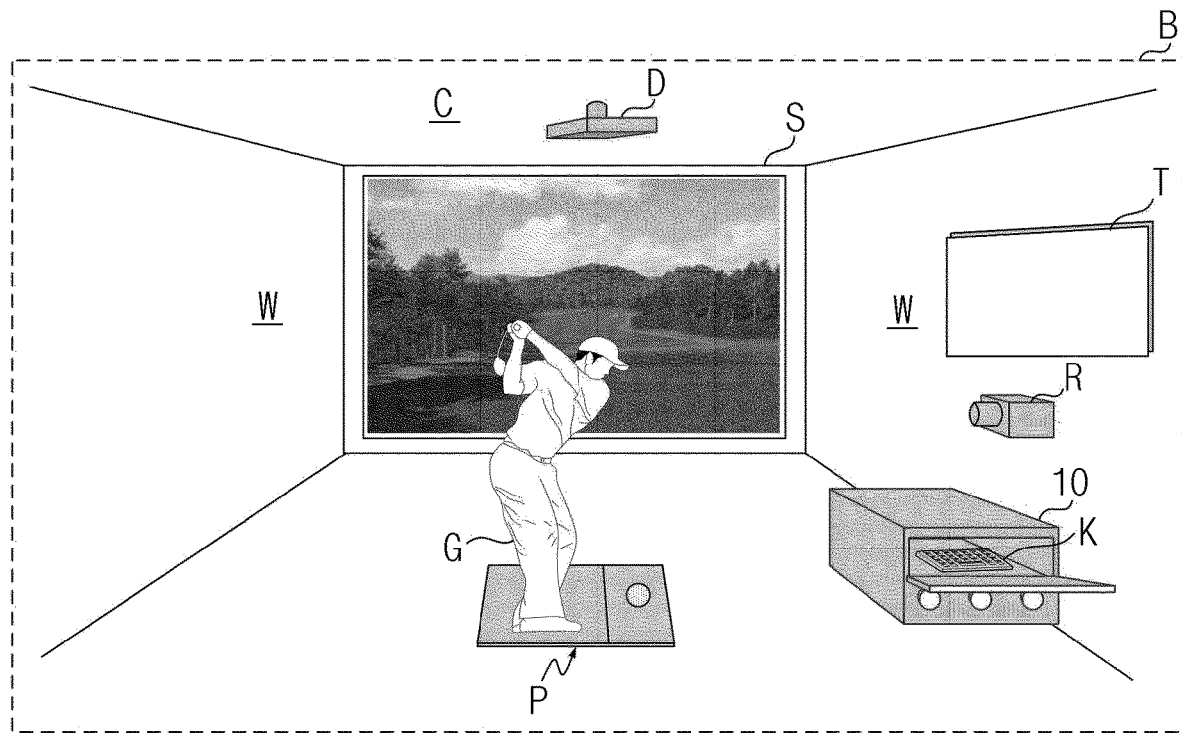
FIG. 2 illustrates an example in which a virtual golf simulation device has been implemented via a virtual golf driving range according to an embodiment of the present invention.

In connection with this, FIG. 2 illustrates an example in which a virtual golf simulation device has been implemented via a virtual golf driving range according to an embodiment of the present invention.

The virtual golf simulation device 10 according to an embodiment of the present invention is connected to a manipulation device for the purpose of various types of settings for the play of a virtual golf game, which may be manipulated by a player. The manipulation device may include all types of devices capable of transferring the player's instructions to the virtual golf simulation device, and may be, e.g., a touch screen T, a keyboard K, or the like. Alternatively, the manipulation device may be implemented using a key manipulation unit (not shown), the terminal 20 of the player, or the like on a swing plate P so that the player can conveniently manipulate the settings of virtual golf simulation on the swing plate P on which the player can hit golf shots. The player may manipulate the golf simulation device 10 via the manipulation device.

Furthermore, the virtual golf simulation device 10 according to an embodiment of the present invention is connected to a sensor device configured to sense a hit of a golf ball by the player. The sensor device may be implemented using an optical sensor (an IR/laser/LED sensor) installed, e.g., on the swing plate P of the player, or may be implemented using a camera sensor installed on the ceiling C or sidewall W of a golf booth B.

Furthermore, the virtual golf simulation device 10 according to an embodiment of the present invention is connected to an imaging device configured to image the golf shot operation of the player. The imaging device may be implemented using a camera R installed on, e.g., on the ceiling C or sidewall W of the golf booth B.

Furthermore, the virtual golf simulation device 10 according to an embodiment of the present invention is connected to an image output device D configured to output a simulation result in the form of an image. For example, as shown FIG. 2, the image output device D may output an image of a result obtained by simulating a golf shot of a player G onto a screen S located in front of the player G.

In other words, the virtual golf simulation device 10 according to an embodiment of the present invention may simulate a sensing result sensed by the sensor device, and may display the result via the image output device D.

The player may play a golf game with a virtual user or another player via the above-described virtual golf simulation device 10.

Meanwhile, while communicating with at least one virtual golf simulation device 10, the server 30 according to an embodiment of the present invention enables a player, who is playing a virtual golf game via one virtual golf simulation device 10, to form a team with another player and then play the virtual golf game, or enables a player, who is playing a virtual golf game via one virtual golf simulation device 10, to play the virtual golf game with a virtual user selected as an opponent.

In connection with this, a player matching device according to an embodiment of the present invention is a device for matching a virtual user having skill identical or similar to that of a player with the player. The player matching device may be implemented by the virtual golf simulation device 10 or server 30. Furthermore, the individual components of the player matching device may be implemented by each of the virtual golf simulation device 10 and the server 30. However, for ease of description, the following description will be given on the assumption that the server 30 is the player matching device.

Figure 3:
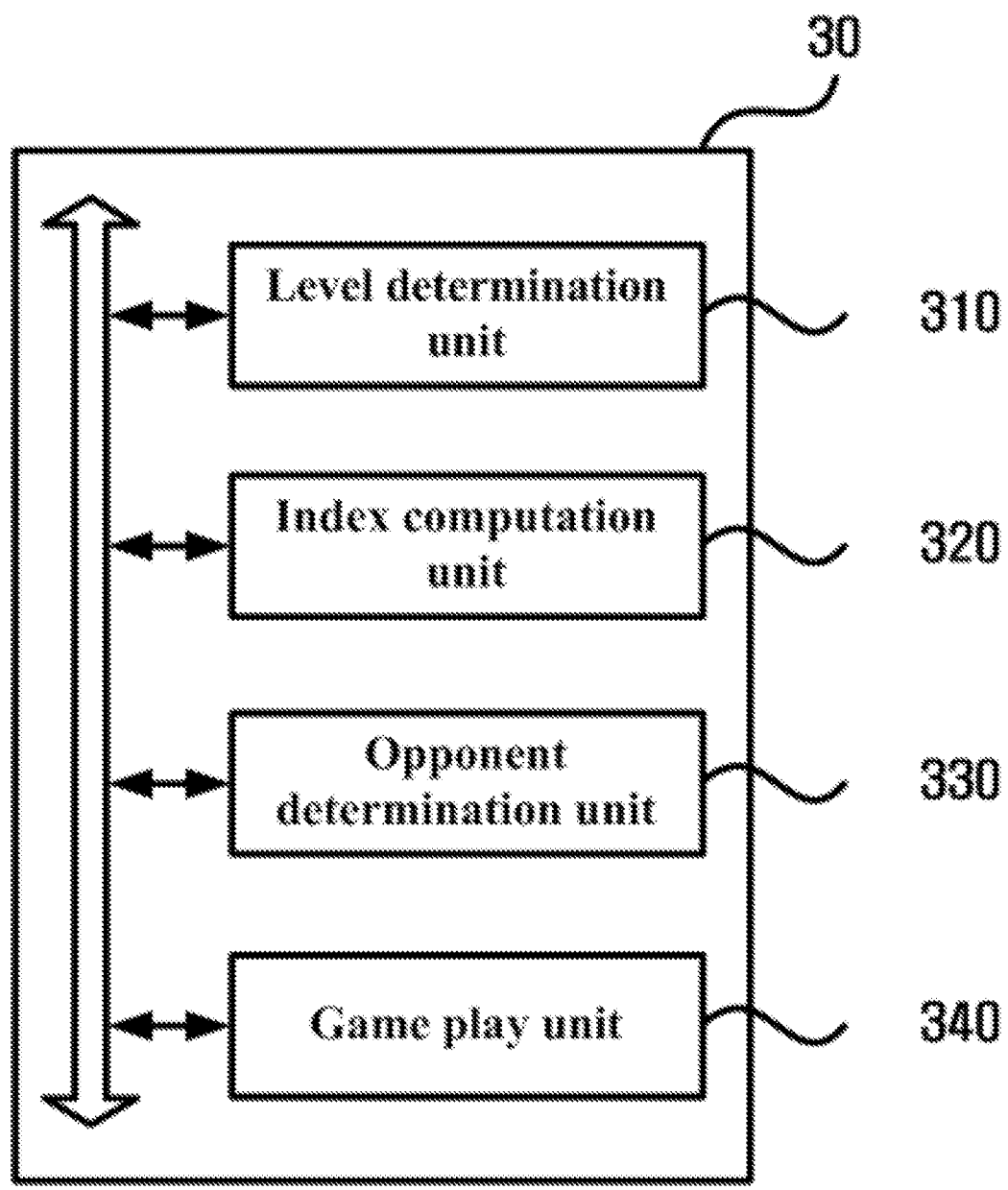
FIG. 3 is a block diagram showing a player matching device according to an embodiment of the present invention.

FIG. 3 is a block diagram showing a player matching device according to an embodiment of the present invention.

As shown FIG. 3, a player matching device 30 according to a preferred embodiment of the present invention includes a level determination unit 310 configured to determine at least one of the skill level of a player and the skill level of a virtual user.

In connection with this, the skill level of a player and the skill level of a virtual user may be used to extract the virtual user in order to match the virtual user with the player. In this case, at least one virtual user having a skill level within a predetermined range may be extracted based on the skill level of a team including a player, and the skill level of a team including a player may be the average of the skill levels of respective players constituting the team. In contrast, even when a player does not form a team, the skill level of the player may be determined to be a team skill level on the assumption that the player forms a team.

The level determination unit 310 may determine the skill level of a player or virtual user according to various embodiments.

First Embodiment

According to a first embodiment of the present invention, the level determination unit 310 may determine the skill level of a player based on the skill index of the player.

The level determination unit 310 may group skill indices according to their range, and may determine levels for respective groups. Furthermore, the level determination unit 310 may determine the skill level of a player, included in a predetermined group, to be a level corresponding to the corresponding group.

For example, the level determination unit 310 may group players having a skill index below '72 strokes,' and may map a 'phoenix' level to the corresponding group. Accordingly, the level determination unit 310 may determine a corresponding skill level to be a 'phoenix' level for players having a skill index below '72 strokes.' In the same manner, the level determination unit 310 may determine a corresponding skill level to be an 'eagle' level for players having a skill index 'equal to or higher than 72 strokes and equal to or lower than 81 strokes,' may determine a corresponding skill level to be a 'magpie' level for players having a skill index 'equal to or higher than 82 strokes and equal to or lower than 90 strokes,' may determine a corresponding skill level to be a 'dove' level for players having a skill index 'equal to or higher than 91 strokes and equal to or lower than 107 strokes,' and may determine a corresponding skill level to be a 'chick' level for players having a skill index 'equal to or higher than 108 strokes.'

Second Embodiment

According to a second embodiment of the present invention, the level determination unit 310 may determine the skill level of a player based on the skill index of the player.

The level determination unit 310 may determine the skill level of a player to be a level corresponding to a group including the skill index of the player when the player satisfies a predetermined condition for a promotion from a level below the level corresponding to the group including the skill index of the player to the level corresponding to the group including the skill index of the player.

In other words, the level determination unit 310 may group skill indices according to their range, and may determine levels for respective groups. Additionally, when a player, who belongs to a corresponding group and may move to a group higher than the corresponding group, satisfies a predetermined condition, the skill level of the player may be determined to be a skill level corresponding to the higher group.

For example, when the skill level determination unit 310 determines the level of players having a skill index 'equal to or higher than 90 and lower than 100' to be a '3' level and determines the level of players having a skill index 'equal to or higher than 100 and lower than 110' to be a '4' level, the skill level of a player whose skill index has increased from 99 to 100 may be promoted from the '3' level to the '4' level when he or she satisfies a predetermined condition, e.g., the condition that experience points accumulated after the completion of a round are 100 points or more.

Third Embodiment

According to a third embodiment of the present invention, the level determination unit 310 may determine the skill level of a player based on the skill index of the player.

The level determination unit 310 may determine at least one of first and second levels for the skill level of a player. In this case, the level determination unit 310 may group skill indices according to their range, may determine the first level to be a level corresponding to a group including the skill index of the player, and may determine the second level, i.e., a detailed level of the first level, to be a level corresponding to a detailed group obtained by subdividing the group including the skill index of the player.

In other words, the level determination unit 310 may group skill indices according to their range, and may determine first levels for respective groups. Furthermore, the level determination unit 310 may determine a first level corresponding to a predetermined group to be the skill level of a player included in the corresponding group.

For example, the level determination unit 310 may determine the first level of players having a skill index in the range from '−16 to −1' to be an 'eagle' level, may determine the first level of players having a skill index in the range from '0 to +7' to be a 'hawk' level, and may determine the first level of players having a skill index in the range from '+8 to +17' to be a 'crane' level.

Furthermore, the level determination unit 310 may determine a second level, i.e., a detailed level of the first level. In this case, for example, the level determination unit 310 may divide the group corresponding to the first level into detailed groups and determine second levels corresponding to the detailed groups so that the top 10%, next top 30%, and bottom 60% of the players included in the group corresponding to the first level can be matched with different second levels, respectively. Furthermore, the level determination unit 310 determines the skill level of a player to be a second level corresponding to a corresponding percentage by determining the top percentage of a predetermined group in which the player included in the corresponding group is included.

For example, the level determination unit 310 may determine the top 10% of players included in an 'eagle' level to have an 'eagle gold' level, may determine the next top 30% thereof to have an 'eagle silver' level, and may determine the bottom 60% thereof to have an 'eagle bronze.'

In the same manner, the level determination unit 310 may determine second levels for players included in each of the other first levels, i.e., a 'hawk' level and a 'crane' level.

In connection with this, the level determination unit 310 may determine the skill level of a player based on the number of virtual golf games played by the player for a predetermined period.

In other words, the level determination unit 310 may determine the skill level of a player to be at least one of first and second levels based on the number of virtual golf games played by the player for a predetermined period.

For example, the skill level of a player, who has played less than 20 games for three recent months from the time at which the skill level of the player is determined, may be determined to be the first level, and the skill level of a player, who has played 20 games or more, may be determined to be the second level. Furthermore, the level determination unit 310 may determine both the first and second levels for the skill level of a player.

Fourth Embodiment

According to a fourth embodiment of the present invention, the level determination unit 310 may determine the skill level of a player based on the number of virtual golf games played by the player for a predetermined period.

In other words, the level determination unit 310 may determine the skill level of a player to be a level set by default based on the number of virtual golf games played by the player for a predetermined period.

In contrast, the level determination unit 310 may determine the skill level of a player based on the skill index of the player.

In other words, the level determination unit 310 may determine the skill level of a player based on a skill index corresponding to a group including the skill index of the player and the rank of the player when skill indices are grouped according to their range and the group including the skill index of the player satisfies a predetermined condition.

For example, the skill level of a player, who has played less than 10 games for recent three months from the time at which the skill level of the player, may be determined to be a fixed skill level, e.g., an 'egg' level, and only the skill level of a player, who has played 10 games or more, may be determined based on a skill index.

The level determination unit 310 may determine the skill level of a player based on the skill index of the player when determining the skill level of the player. In this case, the level determination unit 310 may group skill indices according to their range, and may determine levels for respective groups. When a group in each range satisfies a predetermined condition, the group may be subdivided by applying an additional criterion, other than the skill index, and levels corresponding to detailed groups may be determined.

For example, the level determination unit 310 may group players having a skill index equal to or higher than '72' according to their skill index range, and may determine levels for respective groups.

The level of players having a skill index 'equal to or higher than 110' may be determined to be a 'beginner' level, the level of players having a skill index 'equal to or higher than 100 and lower than 110' may be determined to be a 'junior' level, the level of players having a skill index 'equal to or higher than 90 and lower than 100' may be determined to be a 'rookie' level, the level of players having a skill index 'equal to or higher than 80 and lower than 90' may be determined to be an 'amateur' level, and the level of players having a skill index 'equal to or higher than 72 and lower than 80' may be determined to be a 'semiprofessional' level.

In contrast, for example, the level determination unit 310 may determine the level of corresponding players to be a 'professional' level. In this case, when players having a skill index 'lower than 72' satisfy a predetermined condition (for example, the condition that a predetermined or larger number of games have been played, the condition that there is information about golf ranking, or the like), levels corresponding to the players may be determined in a detailed manner. For example, levels are subdivided and determined based on the corresponding percentage ranges of the ranks of players in the rankings. More specifically, the skill indices and ranks of players are taken into account, and, among players having a skill index 'lower than 72,' players belonging to the top 7% of the rankings may be determined to have a 'champion gold' level, players higher than top 7% and equal to or lower than 10% may be determined to be a 'champion' level, players higher than 10% and equal to or lower than 15% may be determined to have a 'legend' level, and players located between top 15% and 20% may be determined to have a 'challenger' level. When the players having a skill index 'lower than 72' do not satisfy the above-described predetermined condition, the level determination unit 310 may determine the level of the corresponding players to be a 'professional' level.

The level determination unit 310 may determine skill levels according to the above-described first to fourth embodiments.

Such skill levels enable a virtual user or players having similar levels to play games in a competitive manner.

Meanwhile, a player matching device 30 according to a preferred embodiment of the present invention may further include an index computation unit 320 configured to compute a skill index used to determine the skill level of a player.

The index computation unit 320 may determine the skill index of each of a player and a virtual user according to various embodiments.

Fifth Embodiment

According to a fifth embodiment, the index computation unit 320 may compute the skill index of a player based on the play of the player in at least one of virtual golf games played by the player.

In other words, a score may be generated based on play in a golf game. The index computation unit 320 may compute the skill index of a player based on the score of the player in at least one of virtual golf games played by the player in the past.

In other words, a skill index is based on play data when a player actually plays a golf game with another player. For example, a skill index may be the average value of the scores of a predetermined number of games selected from among one or more games most recently played by a player.

Accordingly, for example, the index computation unit 320 may compute the average of the scores of 8 games obtained by excluding the higher and lowest score games from 10 virtual golf games recently played by a player, and may determine a skill index to be the computation result.

Sixth Embodiment

According to a sixth embodiment, the index computation unit 320 may compute the skill index of a player based on the play of the player in at least one of virtual golf games played by the player.

In other words, the index computation unit 320 may compute a skill index as a result obtained by applying the evaluation of a corresponding golf course and a round environment to the score of a player in at least one of virtual golf games played by the player in the past.

For example, the evaluation of a virtual golf course and a round environment may be represented by course scores. A golf course environment evaluated as being difficult to play in may have a higher course score, and a golf course environment evaluated as being easy to play in may have a lower course score. Accordingly for example, the index computation unit 320 may select a virtual golf course, for which it is determined that it is difficult to compute a skill index, in virtual golf games played by a player in the past. When the score of the player is '+4' on the corresponding golf course and a course score is '−2,' the corresponding golf course may be evaluated as being easy to play on. Accordingly, the skill index of the player may be computed as a total score '+6' obtained by adding 2 to the score '+4' of the player.

Seventh Embodiment

According to a seventh embodiment, the index computation unit 320 may compute the skill index of a player based on the play of the player in one or more of virtual golf games played by the player.

In other words, the index computation unit 320 may compute a skill index as the average value of the handicaps of a player in one or more of virtual golf games played by the player in the past.

The index computation unit 320 may modify hole scores in one or more of virtual golf games played by a player, may select one or more games having a relatively high one of the modified scores, and may compute a skill index as the average value of the handicaps of the player in the selected one or more games.

For example, the index computation unit 320 may modify an abnormally higher one of hole scores in respective games most recently played by a player. For example, in the case where a specific hole score is 40 when a player plays a game, the corresponding hole score may be modified to 10.

Accordingly, the index computation unit 320 may select one or more games having a relatively higher one of the modified scores, may compute the average value of the handicaps of the player in the selected games, and may determine a skill index to be the average value.

In other words, the index computation unit 320 may select one or more games having a relatively higher score based on the modified scores. The number of selected games may vary depending on the total number of games recently played by a player. For example, when the player has played one to six games, a single game having the highest score may be selected from among them. When the player has played nine to ten games, three games having the highest score may be selected. When the player has played 20 games or more, ten games having the highest score may be selected.

Furthermore, the average value of handicaps in the selected game(s) may be obtained, and a skill index may be determined to be a value obtained by applying a predetermined percentage (e.g., 96%) to the average value.

Eighth Embodiment

According to an eighth embodiment, the index computation unit 320 may compute the skill index of a player based on the play of the player in one or more of virtual golf games played by the player.

In other words, the index computation unit 320 may compute a skill index as the average value of the handicaps of a player in one or more of virtual golf games played by the player in the past.

In other words, a skill index is based on play data when a player actually plays a golf game with another player. For example, a skill index may be an average handicap computed based on the play data of a predetermined number of games selected from among one or more games most recently played by a player.

The skill index of a player may be updated at predetermined intervals. A method of computing the skill index of a player will be described in detail below.

In other words, the scores of respective games most recently played by a player may be modified based on, e.g., at least one of green speed and wind strength, games having a relatively high one of the modified scores may be selected, the average value of the handicaps of the player in the individual games may be computed, and a skill index may be determined to be the average value.

More specifically, each of the game scores may be primarily modified based on the number of mulligans used in a corresponding game and the remaining distance when a concession is applied, and the modified score may be secondarily modified by taking into account the influence of the environment settings (green speed, wind strength, a tee location, the degree of difficulty of the game, a swing plate, etc.) of the game on the score. Thereafter, the secondarily modified score may be modified by incorporating the degree of difficulty of a course thereinto. The degree of difficulty of a course is the relative degree of difficulty of the course computed based on seniors having little score fluctuation, and may be the average value of scores achieved by scratch golfers with an average of 72 strokes on the corresponding course. The secondarily modified score may be modified by subtracting the value of the degree of difficulty of the course therefrom. Additionally, the score of each game may be finally computed in such a manner as to modify the score by incorporating the difference between the average scores of the scratch golfers and bogey golfers thereinto in the corresponding course.

For example, the skill index of a player may be acquired by selecting a number of best score games equal to a half of a predetermined number from among the predetermined number of games based on the scores modified as described above and then computing the average value of the handicaps of the selected games.

For example, such a skill index may be referred to during the play of a golf game between a player and another player, and may be used to adjust the number of strokes of each of the players for each skill. In this case, a player matching method according to an embodiment of the present invention is applied to a virtual golf game using a virtual golf simulation device in a virtual golf driving range, and, thus, the skill index may be viewed as a handicap optimally computed for screen golf.

Ninth Embodiment

According to a ninth embodiment, the index computation unit 320 may compute the skill index of a player based on the play of the player in one or more of virtual golf games played by the player.

In other words, for example, the index computation unit 320 may accumulate the time spent in one or more virtual golf games played by a player in the past, and may compute a skill index based on a total cumulative time.

For example, a skill index may be computed as a total time obtained by summing the cumulative times spent in all virtual golf games played by a player in the past.

According to the fifth to ninth embodiments configured to determine a skill index as described above, the index computation unit 320 may compute a skill index. Furthermore, the skill index may be used when a skill level is determined by the level determination unit 310.

For example, a skill index computed according to one of the fifth to ninth embodiments may be used when a skill level is determined according to any one of the first to fourth embodiments.

As described above, at least one of the skill level (or the skill index) of a player and the skill level (or the skill index) of a virtual user may be determined.

Meanwhile, a player matching device 30 according to a preferred embodiment of the present invention may further include an opponent determination unit 330 configured to determine an opponent who may play a virtual golf game with a player.

The opponent determination unit 330 may extract one or more virtual users having a skill level within a predetermined range based on the skill level of a player, and may determine an opponent including at least part of the extracted virtual users. Furthermore, the opponent determination unit 330 may extract one or more virtual users having a skill level within a predetermined range based on the skill level of a team including a player, and may determine an opponent including at least part of the extracted virtual users.

The opponent determination unit 330 may filter out one or more virtual users, having play data on being played by a number of players equal to the number of players of the team including the player, in the extracted virtual users.

Furthermore, the opponent determination unit 330 may filter out one or more virtual users, having set an amount within a predetermined range as a bet amount based the bet amount of the team including the player, in the extracted virtual users.

Moreover, the opponent determination unit 330 may determine an opponent to be a virtual user who belongs to both the filtered-out virtual users and virtual users having the earliest play data and who is a recording player.

In this case, the opponent determination unit 330 may not determine a recording player. Accordingly, when a recording player is not determined, the opponent determination unit 330 may determine an opponent to be a virtual user who is a ghost player.

When determining an opponent to be a ghost player, the opponent determination unit 330 may determine the opponent to be a ghost player having a skill level identical or closest to that of the player without being matched with any player for the longest period, and may allow the resulting ghost player and the player to play a golf game.

Meanwhile, a player matching device 30 according to a preferred embodiment of the present invention may further include a game play unit 340 configured to enable a player to play a virtual golf game with an opponent, determined by the opponent determination unit 330, on a virtual golf course.

In other words, the game play unit 340 provides support such that a virtual user, finally determined to be a virtual user matched with a player according to the above-described method, and the player may play a virtual golf game with each other on a virtual golf course.

For this purpose, for example, the game play unit 340, at each hole of the virtual golf course, may output a result reflecting a detection result attributable to the detection of a golf shot of the player onto a screen during a turn of play of the player, and may output information about the path of a golf ball attributable to a golf shot of the virtual user onto the screen at a turn of play of the virtual user.

Meanwhile, a player matching device 30 according to a preferred embodiment of the present invention may further include a communication unit (not shown) configured to enable communication between internal components, i.e., the level determination unit 310, the index computation unit 320, the opponent determination unit 330, and the game play unit 340 and to also enable communication with an external component.

Furthermore, a player matching device 30 according to a preferred embodiment of the present invention may further include a control unit (not shown) configured to control operations between the internal components, i.e., the level determination unit 310, the index computation unit 320, the opponent determination unit 330, and the game play unit 340.

Furthermore, a player matching device 30 according to a preferred embodiment of the present invention may further include a storage unit (not shown) which stores data used to perform a player matching method, or may communicate with a storage device (not shown), e.g., a database, which is located in the outside.

Figure 4:
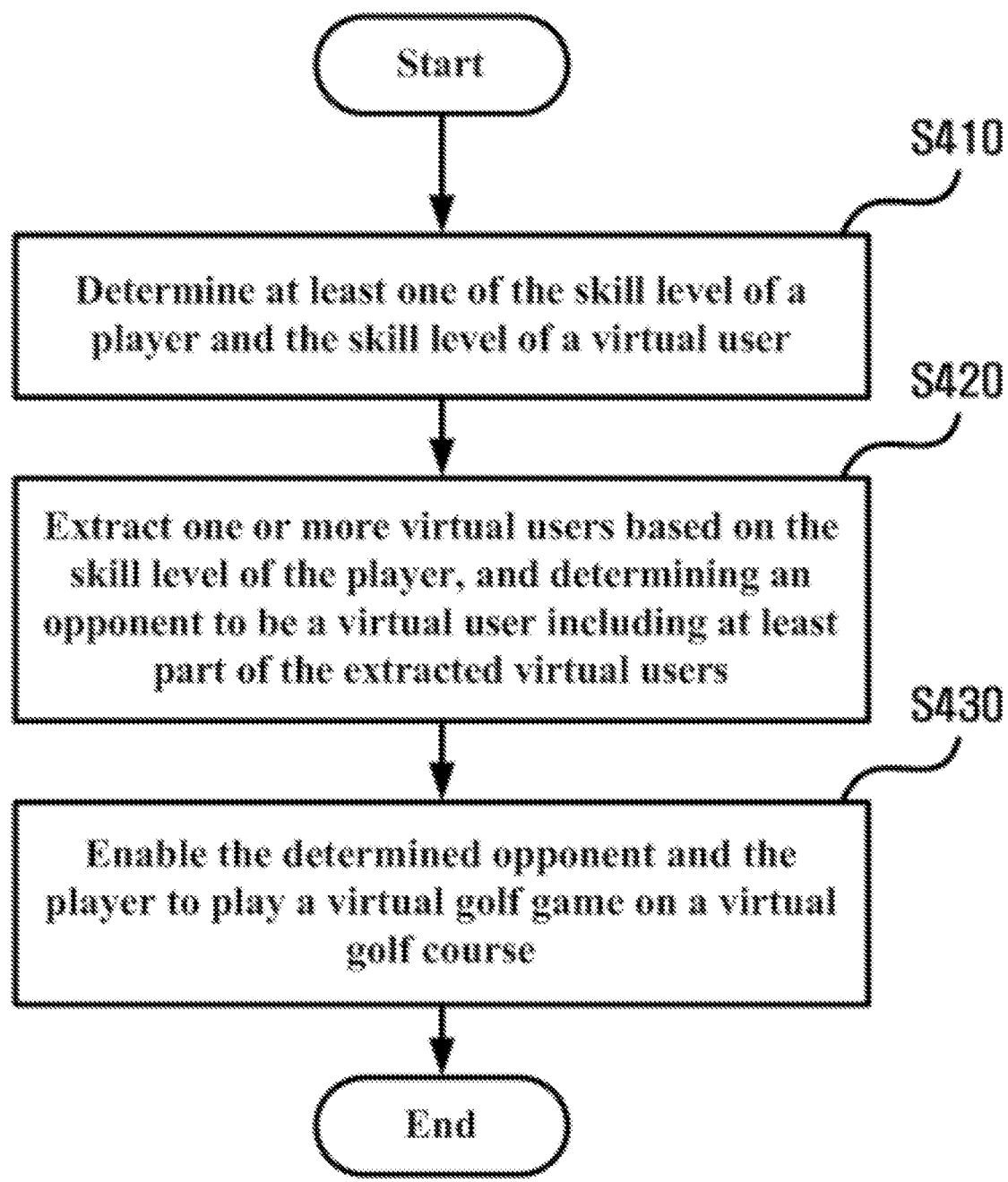
FIGS. 4 and 5 are flowcharts illustrating player matching methods according to embodiments of the present invention.
Figure 5:
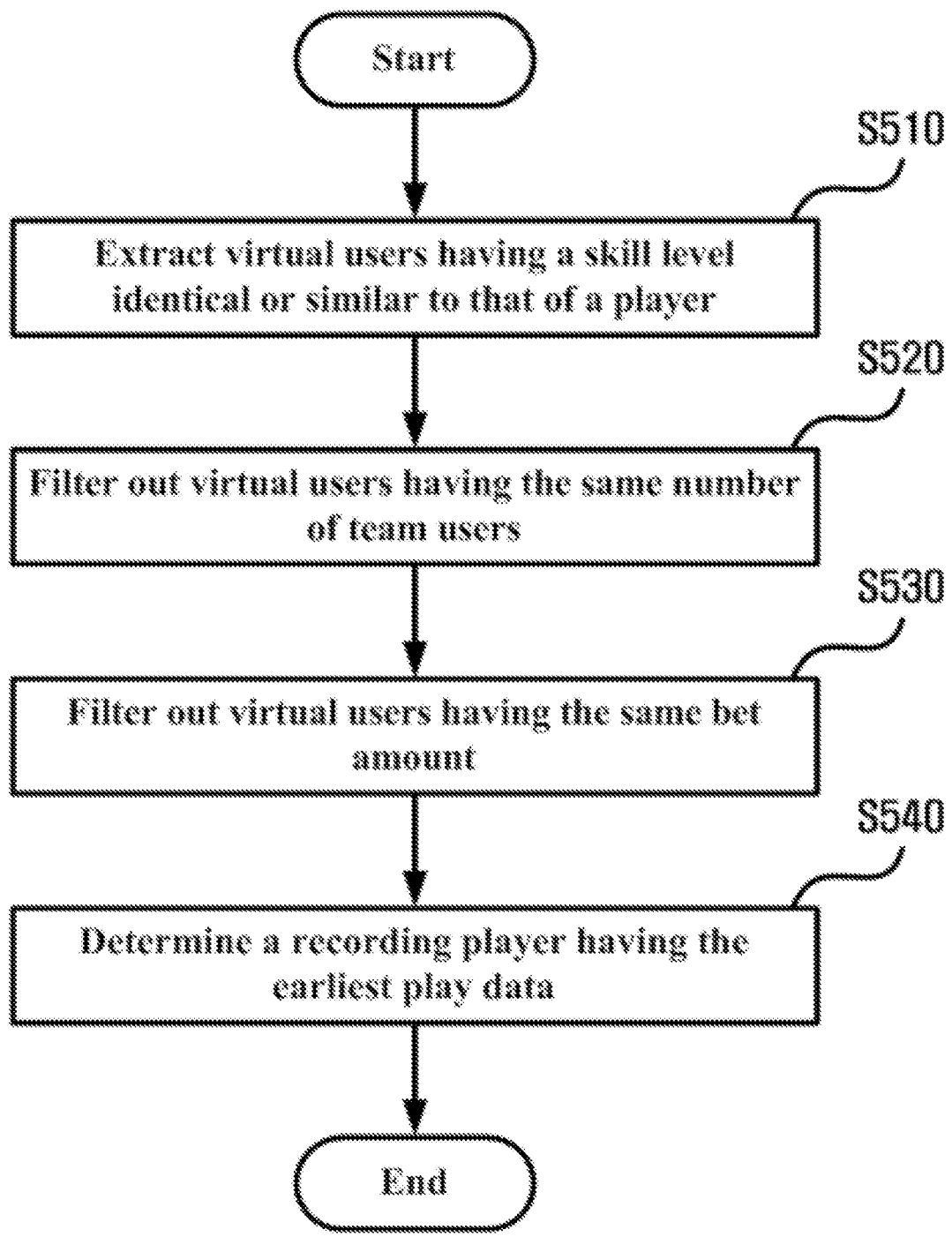

Meanwhile, FIGS. 4 and 5 are flowcharts illustrating matching methods according to embodiments of the present invention.

Each of the matching methods according to the embodiments shown in FIGS. 4 and 5 includes the steps processed in a time series manner in a corresponding one of the player matching devices 30 shown in FIGS. 1 to 3. Accordingly, items which are omitted in the following description but have been described in conjunction with the player matching devices 30 shown in FIGS. 1 to 3 may be also applied to the player matching methods according to the embodiments shown in FIGS. 4 and 5.

First, as shown FIG. 4, the player matching device 30 may determine at least one of the skill level of a player and the skill level of a virtual user at step S410.

The player matching device 30 may determine the skill level of the player or virtual user according to the above-described first to fourth embodiments.

In connection with this, the player matching device 30 may compute the skill level of a team including a player. In this case, the skill level of the team including the player may be the average of the skill levels of players constituting the team. For example, when the number of players constituting the team is 3, a value obtained by dividing the sum of the skill levels of the three respective players by 3 may be the skill level of the team. Alternatively, the skill level of a team including a player may be the same as the skill level of the player by imposing a limitation such that the team is constructed within the same skill level when the team is constructed. In contrast, even when a player does not form a team, the skill level of the player may be determined to be the skill level of a team on the assumption that the player forms the team.

Furthermore, the player matching device 30 may extract virtual users based on skill levels and determine an opponent including at least part of the extracted virtual users at step S420.

In connection with this, a method by which the player matching device 30 determines an opponent will be described with reference to FIG. 5.

As shown in FIG. 5, the player matching device 30 may extract virtual users having a skill level identical or similar to that of a player at step S510.

More specifically, the player matching device 30 may extract one or more virtual users having a skill level within a predetermined range based on the skill level of a team including a player.

For example, the player matching device 30 may extract one or more virtual users having a skill level identical to that of a team including a player or having a skill level within a predetermined range based on the skill level of a team including a player.

Meanwhile, after extracting the virtual users, the player matching device 30 may filter out one or more virtual users having the same number of team users in the extracted virtual users at step S520.

For example, when the number of users of a team including a player is 1, one or more virtual users who have not played games with another player, i.e., virtual users for whom the number of players of a team is 1, may be filtered out. Furthermore, for example, when the number of users of a team including a player is 2, one or more virtual users having play data on having formed a team with another virtual user and played a game may be filtered out in the extracted virtual users. In this case, the other virtual user may be a virtual user included in the extracted virtual users.

Thereafter, the player matching device 30 may filter out one or more virtual users, having set an amount within a predetermined range as a bet amount based the bet amount of the team including the player, in the extracted virtual users at step S530. For example, a virtual user having bet an amount identical to the bet amount of the team including the player may be filtered out.

Furthermore, the player matching device 30 may select a recording player having the earliest play data from among the filtered-out virtual users, thereby determining a virtual user who will play a game with the team including the player at step S540.

For example, the player matching device 30 may arrange the play data of the filtered-out virtual users in descending order of the dates or times on or at which they were generated. Accordingly, the player matching device 30 may select a recording player of virtual users having play data generated at the earliest time, and may determine the opponent of the player to be the recording player.

The player matching device 30 may sufficiently utilize play data registered as the play data of the virtual users by matching the virtual users sequentially from the virtual user having play data generated at the earliest time.

Meanwhile, although steps S510 to S540 have been illustrated as being sequentially performed in FIG. 5, steps S510 to S540 may be performed at the same time, or the sequence of steps S510 to S540 may be changed.

In contrast, since at least part of steps S510 to S540 is not satisfied, the player matching device 30 may not determine a recording player. For example, since the quantity of play data of players who have played games is not sufficient, a recording player having a skill level within a predetermined range may not exist based on the skill level of the player. Alternatively, for example, since a bet amount or the number of players of a team is not sufficient, an appropriate recording player may not exist.

When a recording player is not determined accordingly, the player matching device 30 may search for a ghost player and match the ghost player with the player.

In this case, player matching device 30 may determine an opponent to be a ghost player having a skill level identical or closest to that of the player without being matched with any player for the longest period, and may allow the resulting ghost player and the player to play a golf game.

Once the opponent has been determined, as described above, the player matching device 30 may allow the determined opponent to play a virtual golf game with the player on the virtual golf course at step S430. Accordingly, the player may play a golf game with a virtual user having a level appropriate for the skill level of the player.

Additionally, the skill level of the player may vary depending on the result of play with the virtual user. Furthermore, an amount held by the player is subtracted or increased by a bet amount based on the bet amount.

Furthermore, play data on being played with the virtual user matched with the player may be used as the play data of a virtual user which may be matched with another player in the future.

In contrast, the player corresponding to the virtual user may check a win or a loss (or a tie) when his or her play data is compared with that of another player, and may check whether his or her held amount is subtracted or increased by a predetermined percentage of the bet amount based on the bet amount.

The term 'unit' used herein refers to a software component or a hardware component, such as a Field Programmable Gate Array (FPGA) or an Application Specific Integrated Circuit (ASIC), and a 'unit' performs a specific task. However, the term 'unit' is not limited thereto. A 'unit' may be configured to reside on the addressable storage medium, and may be configured to be executed on one or more processors. Accordingly, a 'unit' may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Functions provided in components and 'units' may be combined into smaller numbers of components and 'units,' or may be separated into additional components and 'units.'

Furthermore, components and 'units' may be configured to be executed on one or more CPUs inside a device or security multimedia card.

Each of the player matching methods according to the embodiments described via FIGS. 4 and 5 may be implemented in the form of a storage medium including computer-executable instructions, such as a computer-executable program module. The computer-readable medium may be any computer-accessible available medium, and includes all volatile and nonvolatile media and separable and non-separable media. Furthermore, the computer-readable medium may include all computer storage media and communication media. The computer storage medium includes volatile, nonvolatile, separable and non-separable media that are intended to store information, such as computer-readable instructions, a data structure, a program module or another type of data, and that is implemented using a desired method or technology. The communication medium typically includes computer-readable instructions, a data structure, a program module, or the data of a modulated data signal such as a carrier, or another type of transmission mechanism, and includes any information transfer medium.

Furthermore, the player matching method according to an embodiment of the present invention may be implemented as a computer program (or a computer program product) including computer-executable instructions. The computer program includes programmable machine instructions that are processed by a processor, and may be implemented as high-level programming language, object-oriented programming language, assembly language, machine language or the like. Furthermore, the computer program may be stored in a tangible computer-readable storage medium (for example, memory, a hard disk, a magnetic medium, an optical medium, a Solid-State Drive (SSD), or the like).

Accordingly, the player matching method according to an embodiment of the present invention may be implemented in such a manner that the above-described computer program is executed by a computing device. The computing device may include at least a part of a high-speed interface coupled to a processor, memory, a storage device, and memory and a high-speed extension port, and a low-speed interface coupled to a low-speed bus and a storage device. These components are coupled to each other using various buses, and may be mounted on a common mother board or may be mounted using another appropriate method.

In this case, the processor may process instructions within a computing device. These instructions are, for example, instructions that are stored in memory or a storage device in order to display graphic information adapted to provide a Graphic User Interface (GUI) onto an external input or output device, such as a display coupled to a high-speed interface. As another embodiment, a plurality of processors and/or a plurality of buses may be used along with a plurality of pieces of memory and a plurality of memory forms. Furthermore, the processor may be implemented as a chipset composed of chips including a plurality of independent analog and/or digital processors.

Furthermore, the memory stores information within a computing device. As an example, the memory may be composed of a volatile memory unit or a set of volatile memory units. As another example, the memory may be composed of a nonvolatile memory unit or a set of nonvolatile memory units. Furthermore, the memory may be, for example, another type of computer-readable medium, such as a magnetic or optical disk.

Additionally, the storage device may provide a large amount of storage space to a computing device. The storage device may be a computer-readable medium or a configuration including such a medium. The storage device may include, for example, devices within a Storage Area Network (SAN) or another configuration. The storage device may be a floppy disk device, a hard disk device, an optical disk device, a tape device, flash memory, another similar semiconductor memory device, or a device array.

The above description of the present invention is intended merely for the purpose of illustration. It will be apparent to those having ordinary knowledge in the art to which the present invention pertains that the present invention can be easily modified in other specific forms without changing the technical spirit and essential features of the present invention. Accordingly, the above-described embodiments are should be understood as being illustrates and not limitative in every aspect. For example, each component described as being in a single form may be practiced in a distributed form and, in the same manner, components described as being in a distributed form may be practiced in an integrated form.

The range of the present invention is defined by the following claims, rather than the detailed description. All variations and modifications derived from the meaning and scope of the claims and concepts equivalent thereto should be construed as being included in the range of the present invention.

INDUSTRIAL APPLICABILITY

The present invention relates generally to a player matching device and a player matching method, and more specifically to a device and method for matching a virtual user capable of playing a virtual golf game with a player on a virtual golf course with the player. Accordingly, the present invention has industrial applicability.

The invention claimed is:

1. A player matching device for matching a player with a virtual user on a virtual golf game, the player matching device comprising:
 a level determination unit configured to determine at least one of a skill level of the player and a skill level of the virtual user, the virtual user being a virtual player who operates based on play data of any other player who played a golf game before a request for a golf game play from the player, the play data comprising information about a path of a golf ball attributable to a golf shot at each hole when the golf game is played; and
 an opponent determination unit configured to determine the virtual user as an opponent capable of playing a virtual golf game with the player,
 wherein the opponent determination unit extracts one or more virtual users having a skill level within a predetermined range based on the skill level of the player, and determines the opponent among the extracted virtual users,
 wherein the level determination unit determines at least one of first and second levels for the skill level of the player, in which case the level determination unit
 groups skill indices according to a predetermined range of the skill indices,
 determines the first level to be a level corresponding to a group including the skill index of the player when the number of virtual golf games played by the player for a predetermined period is less than a predetermined number, and
 determines the second level, which is a detailed level of the first level, to be a level corresponding to a detailed group obtained by subdividing the group including the skill index of the player when the number of virtual golf games played by the player for the predetermined period is same or more than the predetermined number.

2. The player matching device of claim 1, wherein the level determination unit determines the skill level of the player to be the level corresponding to the group including the skill index of the player when the player satisfies a condition for a promotion from a level below the level corresponding to the group including the skill index of the player to the level corresponding to the group including the skill index of the player.

3. The player matching device of claim 1, wherein the level determination unit determines the skill level of the player based on the skill index of the player and a rank of the player.

4. The player matching device of claim 1, further comprising an index computation unit configured to compute the skill index of the player based on play of the player in at least one of virtual golf games played by the player.

5. The player matching device of claim 4, wherein the index computation unit computes the skill index of the player as an average value of scores in one or more of virtual golf games played by the player.

6. The player matching device of claim 4, wherein the index computation unit computes the skill index of the player by applying at least one of an evaluation of a corresponding golf course and a round environment to a score in at least one of virtual golf games played by the player.

7. The player matching device of claim 4, wherein the index computation unit modifies hole scores in one or more of virtual golf games played by the player, selects one or more games having a highest modified score, and computes the skill index of the player as an average value of handicaps of the player in the selected one or more games.

8. The player matching device of claim 4, wherein the index computation unit computes the skill index of the player as an average value of handicaps of the player in one or more of virtual golf games played by the player.

9. The player matching device of claim 4, wherein the index computation unit accumulates times spent in one or more virtual golf games played by the player, and computes the skill index based on a total cumulative time.

10. The player matching device of claim 1, wherein the opponent determination unit filters out one or more virtual users, having play data on being played with a number of team players equal to a number of players of a team including the player, in the extracted virtual users.

11. The player matching device of claim 1, wherein the opponent determination unit filters out one or more virtual users, having set an amount within a predetermined range of a bet amount of a team including the player, in the extracted virtual users.

12. The player matching device of claim 1, wherein the opponent determination unit filters out one or more virtual users, having play data on being played with a number of team players equal to a number of players of a team including the player or having set an amount within a predetermined range of a bet amount of a team including the player, in the extracted virtual users, and determines, among the filtered-out virtual users, a virtual user having play data generated at an earliest time as the opponent.

13. The player matching device of claim 12, wherein the opponent determination unit determines the opponent to be a virtual user who is a ghost player when a recording player does not exist.

14. A computer-readable non-transitory storage medium having stored thereon a program for causing a player matching device to execute matching a player with a virtual user on a virtual golf game, the program causing the player matching device to execute:
 determining, by a level determination unit of the player matching device, at least one of a skill level of the player and a skill level of the virtual user, the virtual user being a virtual player who operates based on play data of any other player who played a golf game before a request for a golf game play from the player, the play data comprising information about a path of a golf ball attributable to a golf shot at each hole when the golf game is played; and
 determining, by an opponent determination unit of the player matching device, the virtual user as an opponent capable of playing a virtual golf game with the player,
 wherein determining the opponent comprises extracting one or more virtual users having a skill level within a predetermined range based on the skill level of the player, and determining the opponent among the extracted virtual users,
 wherein determining the skill level comprises determining at least one of first and second levels for the skill level of the player, wherein determining the first and second levels comprises
 grouping skill indices according to a predetermined range of the skill indices,
 determining the first level to be a level corresponding to a group including the skill index of the player when the number of virtual golf games played by the player for a predetermined period is less than a predetermined number, and determining the second level, which is a detailed level of the first level, to be a level corresponding to a detailed group obtained by subdividing the group including the skill index of the player when the number of virtual golf games played by the player for the predetermined period is same or more than the predetermined number.

* * * * *